L. P. CARHART.
LAWN MOWER.
APPLICATION FILED JAN. 12, 1916.

1,230,086.

Patented June 12, 1917.
3 SHEETS—SHEET 1.

INVENTOR
L. P. Carhart
BY
*[signature]*
ATTORNEY

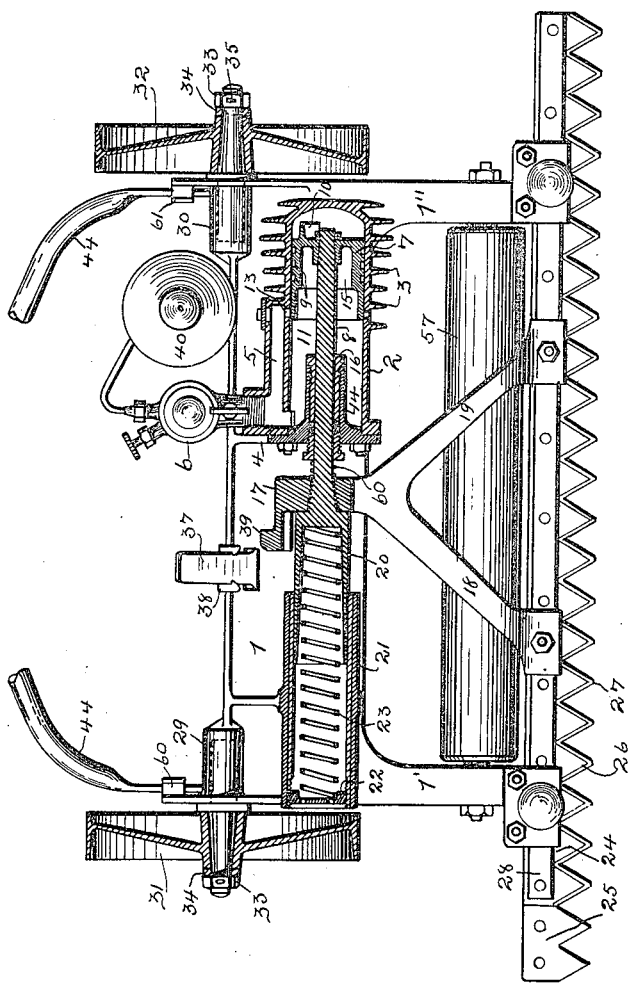

UNITED STATES PATENT OFFICE.

LINDEN P. CARHART, OF BROOKLYN, NEW YORK.

LAWN-MOWER.

1,230,086.   Specification of Letters Patent.   Patented June 12, 1917.

Application filed January 12, 1916. Serial No. 71,691.

*To all whom it may concern:*

Be it known that I, LINDEN PETER CARHART, a citizen of the United States, borough of Brooklyn, county of Kings, city and State of New York, have invented certain new and useful Improvements in Lawn-Mowers, of which the following is a specification.

The device, the subject of this application, is a power operated hand propelled lawn mower and it is designed for the sole purpose of expediting the work of cutting grass in places and under conditions where a motor driven or horse drawn mower could not be conveniently used and where the area to be covered or the irregularity of the surface or the length of the grass would make the use of an ordinary hand mowing machine inexpedient, if not impossible.

This device then may be considered a combination between a hand power mowing machine and a mechanically operated machine, the tractive effort for which is supplied by the operator, but the power required for the actual work of cutting is supplied by a suitably arranged engine.

It will be noted in connection with this device that I employ the principles and the arrangement of knives or cutting blades that have been found so satisfactory in the larger type mowing machines and it will also be found that I have provided means whereby the grass may be cut in a swath greater than the width between the traction wheels. This is important as it obviates the necessity for much tiresome trimming.

The general construction and all of the advantages will be set forth as the specification progresses.

The following is what I consider the best means of carrying out this invention and the accompanying drawings form a part of this specification in which—

Figure 1:
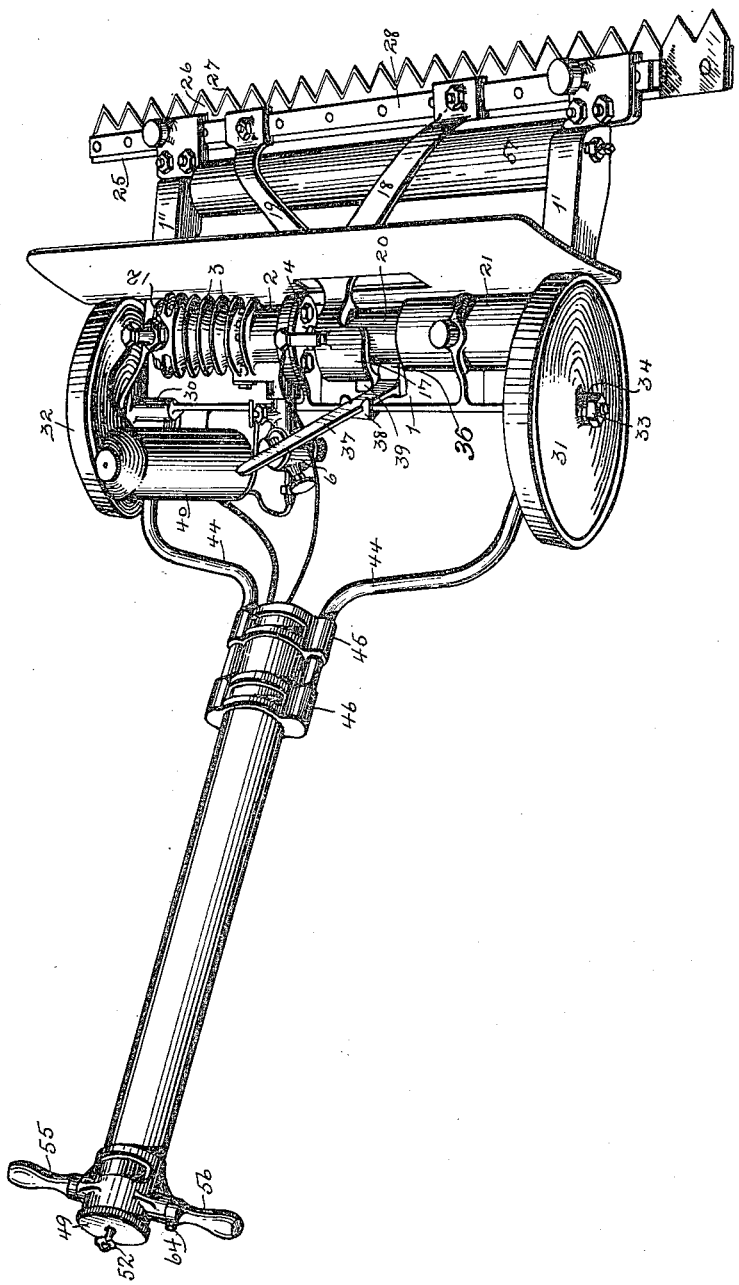
Figure 1 is a perspective view of my device completed and ready for operation.
Figure 2:
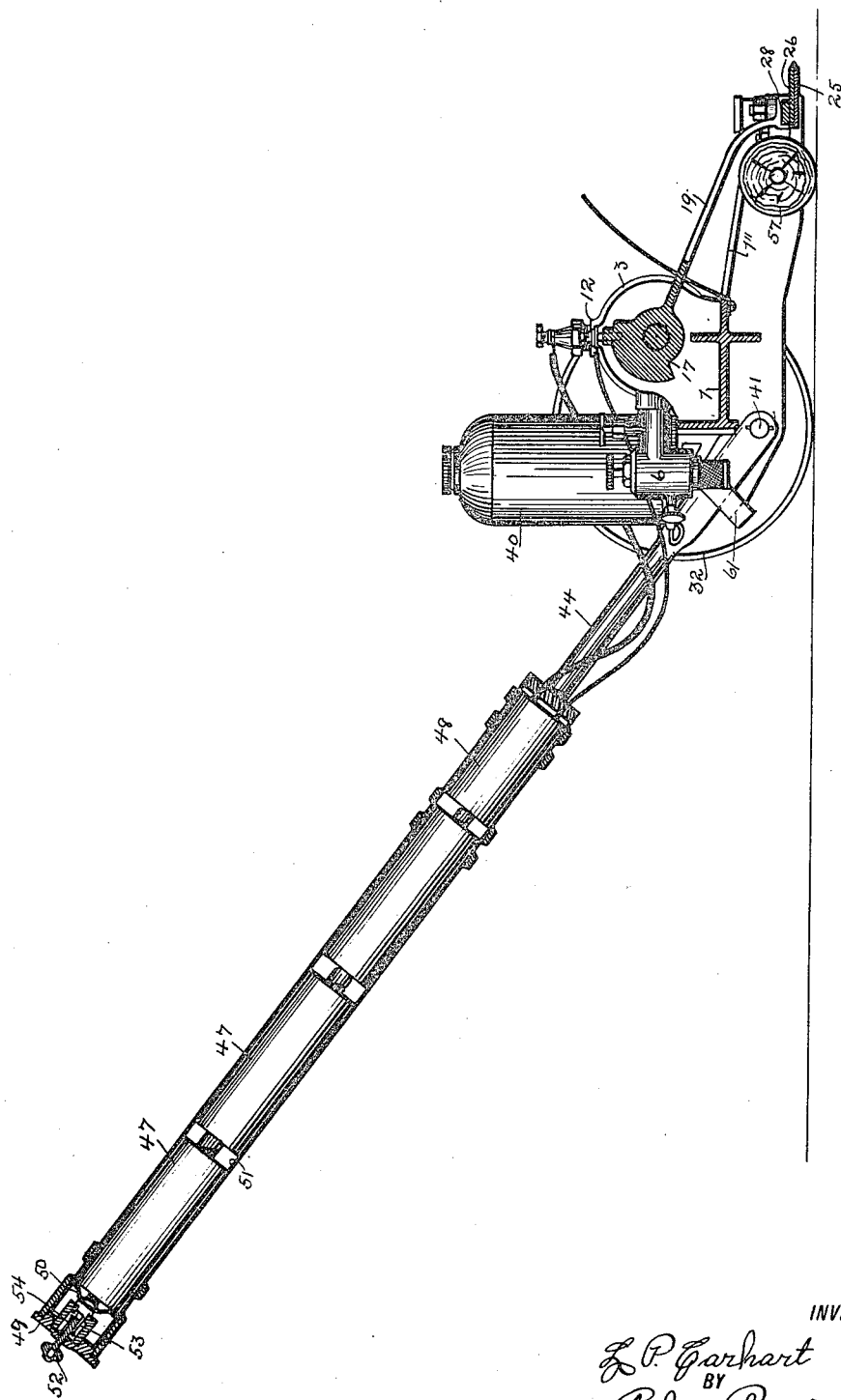
Fig. 2 is an end elevation partly in section.

Fig. 3 a plan view partly in section.

Similar reference numerals indicate like parts in all of the figures where they appear.

The body member or frame work of my device is indicated at 1 and as much of the operative mechanism is supported by or formed integral with this frame work, I will not attempt to describe the member 1 independently but will rather include it with the general description of the device except to say that the frame work in plan represents the wide spread U shaped body having projecting arms 1' and 1''.

Formed integral with the frame 1 or secured thereto is a cylinder 2, which is the cylinder of an internal combustion engine, the engine is air cooled and the cylinder is therefore provided with the flanges 3 which are usually to be found upon an air cooled engine. I provide a bracket 4 to support the forward open end of the cylinder 2 and at one side of the cylinder I produce or secure a suitably arranged plate which produces the by pass or intake passage 5. Connected to the passage 5 is a carbureter 6 which performs the function customary in a device of this character.

Within the cylinder 2 I arrange a piston 7 secured to and operated upon a piston rod 8. The piston may be provided with a plurality of piston rings 9 and at the top of the piston I produce a deflecting flange 10, the function of which will be later described. Near the upper end of the cylinder I provide a boss 12, screw threaded and into which a spark plug is introduced and secured within the cylinder and under the piston 7 is a compression chamber 11 which compresses the gas upon the downward thrust of the piston allowing it to be forcibly introduced into the cylinder through the intake passage 13 when the upper end of the piston opens or uncovers this passage. When the fuel is injected into the cylinder it will impinge upon and be deflected by the projection 10 so that it will not pass across the head of the piston but will rather take an upward course. This will prevent the objectionable stratifying of the fuel quite common in two-cycle engines as such is what I employ.

The open end of the cylinder is closed by the disk 4 and formed integral with this disk 4 is an inward projection 14 which may serve as a bearing for the piston rod 8 and will also serve to reduce the area of the fuel compression chamber. This projection 14 passes into the hollowed portion 15 of the piston and I may provide a suitable gland or packing 16 around the piston rod.

The piston rod extending out of the cylinder of the engine may be screw threaded and rigidly secured to the piston rod is a casting 17 provided with a plurality of arms 18 and 19 extending outward and rigidly secured to the movable part of the cutting member to be later described. Secured to the piston rod or to the casting 17 is a cup shaped member 20 which can be considered a piston and which operates in the cylinder 21. This cylinder 21 may be integral or supported by the frame work 1 and it is obvious that it should be in axial alinement with the cylinder 2. The outer end of the cylinder 21 is closed by means of a cap 22 which is screw threaded into the cylinder 21. I may provide an adjustable relation between these parts.

Within the cylinder 21 and entering the hollowed end of the piston 20 is a spring 23 one end of which spring finds bearing upon the inner side of the cap 22. This spring is compressed by the outward movement of the engine piston and returns the piston to its innermost position compressing the fuel above the piston and therefore the spring 23 serves all of the functions of an ordinary fly-wheel.

The cutter used with my device consists of two blade members 24 and 25 arranged one upon the other and adapted to a relative reciprocal movement. Each of these cutters is provided with teeth as shown at 26 and 27 and grass being received into the teeth is sheared by the relative movement of the parts. The cutting blades are then of a construction and operation usually found in agricultural mowing machines.

In my device the lower blade is secured to and supported by the outwardly extending arms 1' and 1'', which are formed integral with the main frame 1. At the end of the arms 1' and 1'', I arrange bearing and supporting blocks shaped in box section. The lower blade is secured to these blocks but the upper blade has a guide projection 28 which is operable through each of these blocks. To this upper projection or guide member, I secure the arms 18 and 19 of the member 17 and when the engine is operated the upper blade members will be caused to reciprocate across the lower or stationary blade member with the desirable cutting effect.

Formed integral with or secured to the frame 1 is a plurality of lugs 29 and 30 and in these lugs I secure pins upon which the traction wheels 31 and 32 are free to revolve. These wheels may be retained by nuts 33 and washers 34 and may be prevented from rotating by speed pins or cutters 35.

Adjacent to the member 17 and pivoted to the frame 1, I arrange a lever 37 which is free to rock and partially rotate. The lower end of this lever may be provided with a semi-ball shaped member 36 through which the retaining pivot extends, and upon the frame I may secure a clip 38 for retaining the lever 37 in operable position. The lever 37 serves as a means for starting the engine. To operate it the lever is moved out of engagement with the clip 38 and is caused to engage in a slot in the member 17 which has been produced by the lug or projection 39, then when the lever is partially rotated in the direction of the length of the cylinder 2 it will cause the piston 7 to compress the gas or the fuel within the cylinder in the manner and with the result well understood in connection with internal combustion engines.

Supported upon the frame and connected through the carbureter 6 to the engines is a fuel supply tank 40 of a convenient size and it will be understood that the carbureter may be of any preferred construction and that the location of the carbureter and fuel tank may be changed.

Upon the frame 1 and preferably supported below the traction wheels I arrange a plurality of lugs which receive pins 41 and 42. Pivoted upon these pins is the handle member formed as a tube having tubular members 44—44 which loosely engage upon the pins 41 and 42. The handle should be free to swing within a certain limited extent upon its supporting pivots and I provide spring clips 61 and 61' by reason of which the handle may be freed to be depressed or dropped. I may form the projections 44—44 independently of the body of the handle and may secure them to the handle by the collars or castings 45 and 46. The handle is tubular so that I may arrange therein a plurality of cells 47 of a battery and also a spark coil 48 which are connected together and are also connected to the spark plug of the engine.

The cells are retained in the handle by means of a cap 49 and within this cap I arrange a spring 50 which leans upon the uppermost cell holding all of the cells in contact with each other. As one side of the electrical circuit will be grounded with the engine a fiber tube 51 should be arranged in the handle so that the separate cells of the battery will not contact with the sides of the tubular handle.

Through the disk 49 I may pass a plug 52 which completes the circuit between the spring member 53 which is in electrical contact with the battery and the spring member 54 which is grounded to the cap 49 and thus to one side of the engine. The plug 52 serves as a switch and when withdrawn no current can pass to the spark plug and therefore the engine cannot operate. The handle should be provided with outwardly extending grips 55 and 56 which will materially assist in directing the travel of my device best.

A roller 57 should also be arranged adjacent to the cutting knives, such rollers are however, common to lawn mowers in general and I may also provide a shield 58 which will prevent the severed grass from falling backward into the operating parts of my mechanism.

A member not to be overlooked is the spring 60 which is arranged between the member 17 and the cylinder head 4. This spring acts as a cushion and receives the upward thrust of the spring 23 when no firing takes place in the cylinder 2 and prevents the pounding of the member 17 against the piston disk 4 or the end of the piston against the end of the cylinder.

From the foregoing description of the mechanism it is thought that the operation will be fully understood. The device is a lawn mower the tractive effort of which is applied through the medium of the projections 55 and 56. The cutting is accomplished by the power exerted by the engine and the spring 23, which apply their reciprocating force to the plugs 24 and 25 through the medium at the member 17 and its projections 18 and 19. An important advantage of this construction is the great amount of work that can be accomplished with but little effort and also the fact that the blades may be projected beyond the line of the traction wheels and the blades may be operated with but slight or with no movement of the traction wheels. This feature is particularly important when my device is to be used in trimming, in cutting close to hedges, trees or fences, and I desire it understood that modification may be made within the scope of the appending claims without departing from the principles or sacrificing the advantages of the invention.

It will of course be understood that I provide a timer or commutator, and I have also shown a push button 64, on the handle which may be used to cut out the electric circuit to stop the engine when quick action is desired.

I have stated that I arranged a roller adjacent to the cutting knives. This roller may be adjustable to change the depth of the cut.

Having carefully and fully described my invention what I claim and desire to secure by Letters Patent is:

1. A hand propelled lawn mower having means independent of the traction mechanism for operating the cutting mechanism, said means comprising a reciprocating engine and a frame rigidly connected to the piston of said engine and to the movable part of said cutting means.

2. A hand propelled lawn mower having a reciprocating cutting means and a reciprocating means independent of the traction wheels for operating the cutting means, comprising an internal combustion engine a rigid connection between the piston of said engine and said cutting means to obtain a unitary unidirectional movement of said piston and cutting means and a resilient means for obtaining a reverse movement of said piston and said cutting means.

3. A hand propelled mowing machine comprising a reciprocating cutting device and a reciprocating engine the piston of which is rigidly connected to said cutting device and adapted to operate said cutting device in the direction and to the extent of the movement of the piston of the engine as herein specified.

4. A lawn mower having a cutting member, one part of which is adapted to be reciprocated, an engine arranged parallel to said cutting member, and having its piston rod rigidly attached to the movable part of said cutting member and adapted to move said movable part in one direction and a resilient member in line with said engine and parallel to said cutting member and adapted to move the movable part of said cutting member in another direction all arranged for the purpose set forth.

Signed at city of New York, county and State of New York, this 23rd day of Dec. 1915.

L. P. CARHART.

Witnesses:
G. E. S. MARR,
ARTHUR PHELPS MARR.